Dec. 29, 1970   J. E. NEWTON ET AL   3,551,907
TEMPERATURE WARNING DEVICES
Filed Aug. 30, 1967   2 Sheets-Sheet 1
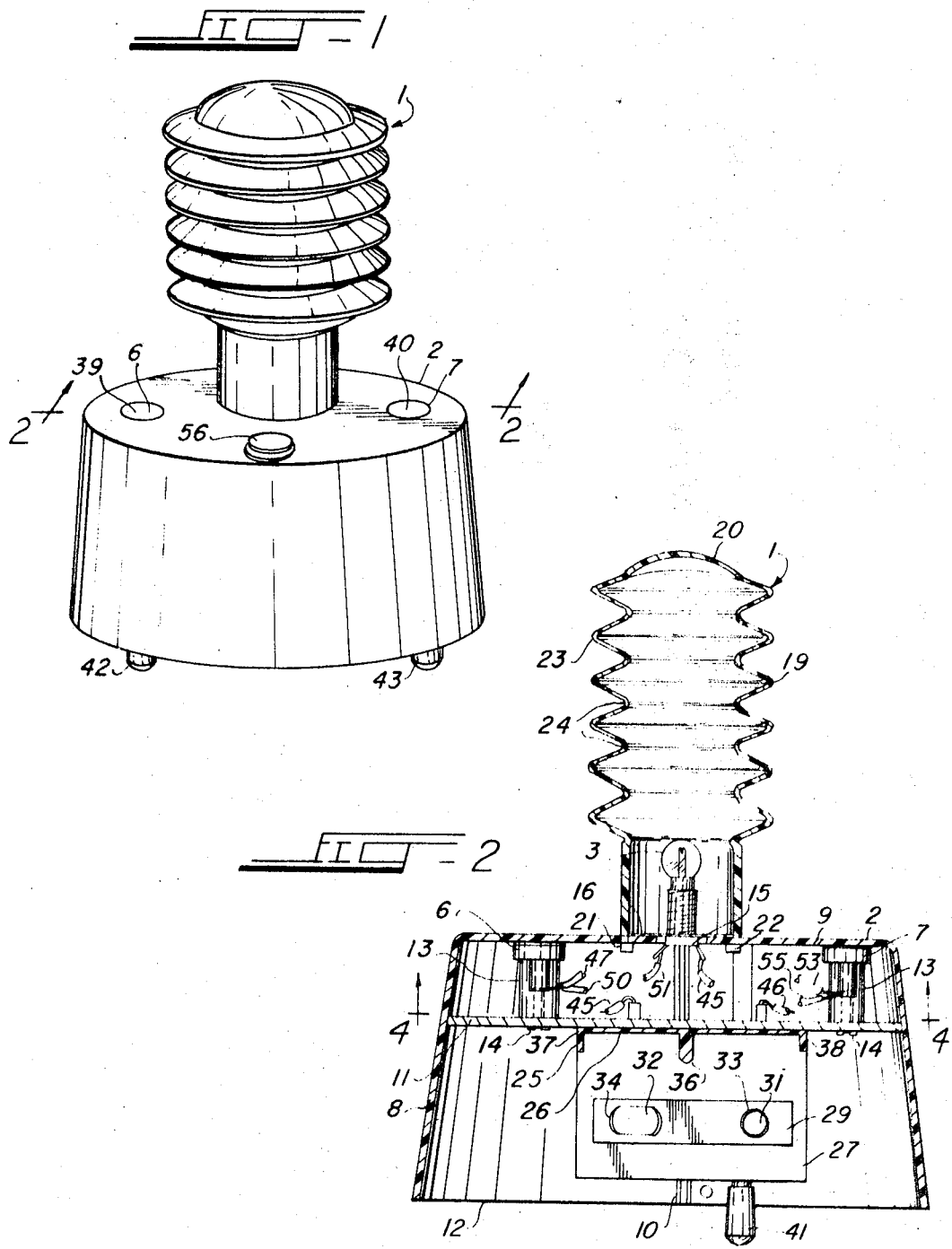
INVENTORS
JAY E. NEWTON
RUSSELL A. SCHMITT
Marshall, Johnston, Cook & Root
BY
ATTY Dec. 29, 1970 J. E. NEWTON ET AL 3,551,907
TEMPERATURE WARNING DEVICES
Filed Aug. 30, 1967 2 Sheets-Sheet 2
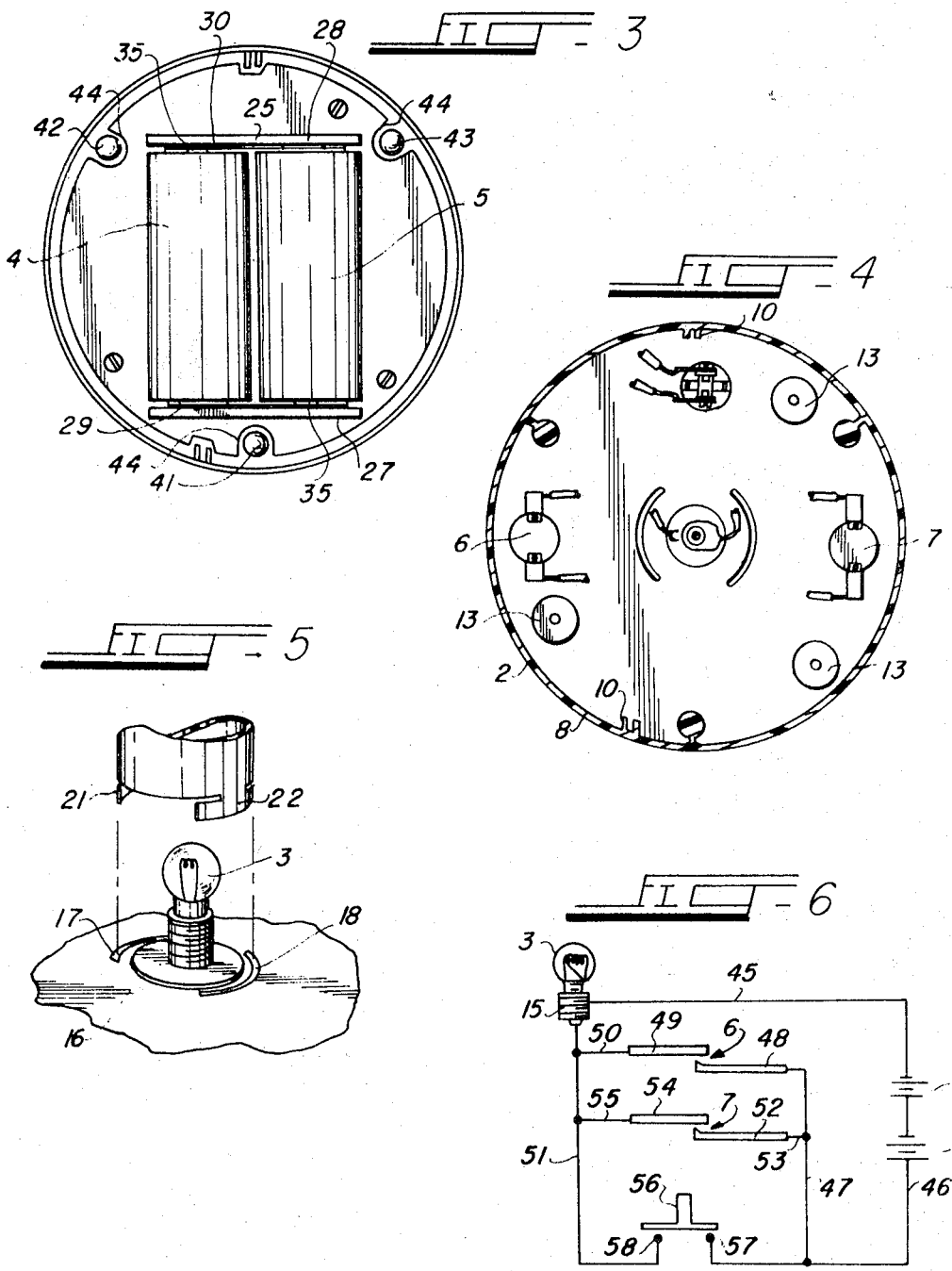
INVENTORS
JAY E. NEWTON
RUSSELL A. SCHMITT

United States Patent Office 3,551,907
Patented Dec. 29, 1970

3,551,907
TEMPERATURE WARNING DEVICES
Jay Earl Newton and Russell Arthur Schmitt, Madison, Wis., assignors to Newell' Corporation, Madison, Wis., a corporation of Wisconsin
Filed Aug. 30, 1967, Ser. No. 664,344
Int. Cl. G08b 17/06
U.S. Cl. 340—227.1                      5 Claims

ABSTRACT OF THE DISCLOSURE

A warning device which embodies high and low temperature, thermostatically actuated switches for effecting a warning signal in response to a decrease or increase in temperature beyond a predetermined temperature range.

BACKGROUND OF THE INVENTION

This invention relates to warning devices and, more particularly, to electrically actuated warning devices for warning of excessively high or low temperatures.

It is a primary object of the present invention to afford a novel electrically operated warning device for warning of excessively low and high temperatures in the surrounding atmosphere.

When a person is absent from his home or office, and the like, it is highly desirable to have at least periodic checks made by someone as to the temperature in the home or office so as to protect against freezing of the water pipes or the presence of an undetected fire, and the like. This is particularly true when a person is absent for relatively prolonged periods, such as, for example, when he is away on vacation. Heretofore, it has been common practice for people absenting themselves from their homes or offices, and the like, to arrange for such periodic checks by neighbors, night watchmen, police, and the like, with the person doing the checking being required to actually enter the home or office to check on the temperature therein. When the temperature is below zero, such checking must take place at more frequent intervals. It is an object of the present invention to afford a novel warning device which eliminates the necessity for a person so checking on the temperature in a home or office, actually entering the home or office.

Electrically actuated warning devices for indicating deviation from predetermined temperatures have been heretofore known in the art. However, such warning devices heretofore known in the art have commonly had several inherent disadvantages, such as, for example, being capable of indicating undesirably high temperatures or undesirably low temperatures, but not both; being large and cumbersome in size; not affording a clearly visible warning signal; being subject to failure if the electric power failed in the house, or the like, in which they were installed; not being readily portable; not being self-contained, so that they were limited as to the locations at which they could be installed; not being readily resettable after once being actuated; not be efficient and reliable in operation; being complicated in construction and operation; or being difficult or expensive to manufacture, and the like. It is an important object of the present invention to overcome such disadvantages.

It is another object of the present invention to afford a novel, self-contained electrically actuated warning device for warning of a decrease or increase in the temperature of the surrounding atmosphere beyond a predetermined temperature range, which does not depend upon any outside source of electric power.

An object ancillary to the foregoing is to afford a novel warning device of the aforementioned type which is not subject to power failure of an outside source of electric power.

Yet another object is to afford a novel warning device of the aforementioned type which is readily portable and self-contained, so that it can be installed in a house, or the like, at any desired location wherein it is readily visible to a person outside the house looking from any desired direction.

A further object of the present invention is to afford a novel electrically actuated warning device of the aforementioned type which is readily resetable after having been actuated.

Another object is to afford a novel warning device of the aforementioned type which is simple in construction and operation.

A further object is to afford a novel warning device of the aformentioned type wherein the parts thereof are readily accessible, and may be quickly and easily removed and replaced.

Another object is to afford a novel electrically actuated warning device of the aforementioned type which is practical and efficient in operation, and which may be readily and economically produced commercially.

Other and further objects of the present invention will be apparent from the following description and claims and are illustrated in the accompanying drawings, which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 1 is a perspective view of a warning device embodying the principles of the present invention;

FIG. 2 is a longitudinal, sectional view through the warning device shown in FIG. 1, looking substantially in the direction of the arrows 2—2 in FIG. 1;

FIG. 3 is a bottom plan view of the warning device shown in FIG. 1;

FIG. 4 is a detail sectional view taken substantially along the line 4—4 in FIG. 2;

FIG. 5 is an exploded, fragmentary perspective view of a portion of the warning device shown in FIG. 2; and FIG. 6 is a wiring diagram for the warning device shown in FIG. 1.

DESCRIPTION OF THE EMBODIMENT SHOWN HEREIN

A warning device 1, embodying the principles of the present invention, is shown in the drawings to illustrate the presently preferred embodiment of the present invention.

The warning device 1 embodies, in general, a housing 2 on which is mounted an electric bulb 3 the energization of which, by a pair of electric, dry-cell batteries 4 and 5 is controlled by a high temperature thermostatically actuated switch 6 and a low temperature thermostatically actuated switch 7, as will be discussed in greater detail presently.

The housing 2 may be made of any suitable material, such as, for example, a suitable plastic material such as high impact polystyrene. It embodies an annular side wall 8, which is closed at the top by a top wall 9, FIG. 2. The side wall 8 preferably embodies inwardly projecting ribs 10 for reinforcing the same.

The housing 2 includes a bottom wall 11 removably mounted therein in upwardly spaced relation to the bottom 12 of the side wall 8, and in downwardly spaced, substantially parallel relation to the top wall 9, FIG. 2. Three bosses or lugs 13 project downwardly from the top wall 9, FIGS. 2 and 4, and the bottom wall 11 is releasably secured thereto by suitable means such as screws or bolts 14. The bosses 13 may be formed integrally with the top wall 9, or they may be made independently of the top wall 9 and then secured thereto by suitable means, such as, for example a suitable adhesive.

A socket 15 is mounted in the radial center of the top wall 9 of the housing 2 in position to removably receive, and support the bulb 3 in upstanding relation to the top wall 9, FIG. 2. A substantially flat, circular reflector 16, is mounted on the upper face of the top wall 9 in surrounding relation to the bulb 3, and two substantially diametrically opposed, arcuate shaped slots 17 and 18, FIG. 5, are formed in and extend through the top wall 9 outwardly of the reflector 16. An elongated chimney 19, having a closed top 20 and diametrically opposed prongs 21 and 22 formed on the lower end thereof, is mounted on the top wall 9 with the prongs 21 and 22 extending downwardly through the slots 17 and 18, respectively. The prongs 21 and 22 and the slots 17 and 18 are of such relative size, and the prongs 21 and 22 are so constituted and arranged on the chimney 19, that to mount the chimney 19 in operative position on the top wall 9, the prongs 21 and 22 may be inserted downwardly through the slots 17 and 18, respectively, and the chimney 19 may then be rotated around its longitudinal axis to thereby latchingly engage the prongs 21 and 22 beneath the top wall 9. Removal of the chimney 19 may be readily effected by first rotating the chimney 19 around its longitudinal axis into position to align the prongs 21 and 22 with respective slots 17 and 18, and then lifting the chimney 19 upwardly from the housing 2.

The chimney 19 is light-permeable, and is preferably made of a red colored, translucent suitable plastic material, such as, for example, polyethylene. The side wall 23 of the chimney 19 extending between the top 20 and the prongs 21 and 22 is preferably corrugated by means of a plurality of vertically spaced, substantially horizontally extending annular corrugations 24. With this construction and particularly with the chimney 19 made of a red colored, translucent material, when the bulb 3 is illuminated and flashing, a readily visible signal emanates from the chimney 19, which affords an attractive, highly practical cover for the bulb 3.

A mounting bracket 25, FIGS. 2 and 3, having a top wall 26 and two oppositely disposed, substantially parallel side walls 27 and 28 projecting therefrom, is mounted on the bottom wall 11 of the housing 2. The mounting bracket 25 is mounted on the bottom wall 11 in such position that the top wall 26 is disposed in juxtaposition to the lower face of the bottom wall 11 with the side walls 27 and 28 projecting downwardly therefrom. The mounting bracket 25 may be made of any suitable material, such as, for example, the aforementioned polystyrene and may be secured to the bottom wall 11 by any suitable means, such as, for example, by a suitable adhesive.

Two elongated electrical connector plates 29 and 30, FIGS. 2 and 3, are mounted on the inner faces of the side walls 27 and 28, respectively, of the mounting bracket 25. The connector plates 29 and 30 may be made of any suitable material, such as, for example, sheet copper, and are identical in construction. Each embodies a relatively small round opening 31 extending through one end thereof and a larger, elongated opening 32 extending through the other end thereof. The openings 31 and 32 are surrounded by raised rims 33 and 34. The rims 33 are preferably of such size as to receive the raised center electrodes 35 commonly embodied in dry-cell batteries of the type of the batteries 4 and 5, FIG. 3. A partition wall 36 projects downwardly from the top wall 26 of the mounting bracket 25 and extends longitudinally therealong between the side walls 27 and 28, and in substantially perpendicular relation thereto. Two side flanges 37 and 38 project downwardly from respective sides of the mounting bracket 25 in substantially parallel relation to the partition wall 36, FIG. 2.

The conductors 29 and 30 are mounted on the side walls 27 and 28 with the openings 31 and 32 in the conductors 29 and 30 disposed in alignment with the openings 32 and 31 in the conductors 30 and 29, respectively. The side walls 27 and 28 of the mounting bracket 25 are so disposed relative to each other that the batteries 4 and 5 may be disposed therebetween, on respective sides of the partition wall 36, with the outwardly projecting center electrodes 35 thereof disposed in the openings 31 of the conductors 30 and 29, respectively, in firm contact with the raised portions 33 extending around the respective openings 31. The other ends of the batteries 4 and 5 are firmly engaged by the raised portions 34 on the conductors 29 and 30, respectively. Thus, when the batteries 4 and 5 are mounted in operative position in the housing 2, they are connected in series with each other. The side walls 27 and 28 of the mounting bracket 25 are sufficiently resilient that the batteries 4 and 5 may be readily moved vertically into and out of operative position in the mounting bracket 25.

The thermostatically actuated switches 6 and 7 are mounted in the top wall 9 of the housing 2 in substantially diametrically opposed relation to each other, FIGS. 1 and 2. The switches 6 and 7 are so mounted in the top wall 9 that the control-thermostat portions 39 and 40 thereof, respectively, are mounted in the top wall 9 in position wherein they are preferably substantially flush with the upper face thereof, and are readily accessible from the top of the housing 2 for a purpose which will be discussed in greater detail presently.

Three legs 41, 42 and 43 are preferably mounted in respective bosses 44 formed on the lower end portion of the side wall 8 of the housing 2 and project downwardly from the side wall 8 in position to support the housing 2 in raised position so as to afford access of air to the interior of the housing 2 for cooling purposes.

With the batteries 4 and 5 mounted in the housing 2 in the manner shown in the drawings, FIG. 3, they are connected in series to each other. One side of the socket 15 is connected by a conductor 45 to one side of the batteries 4 and 5, FIGS. 2 and 6. The other side of the batteries 4 and 5 is connected by a conductor 46 and a conductor 47 to one contact 48 of the normally open, high temperature, thermostatically actuated switch 6. The other contact 49 of the switch 6 is connected by a conductor 50 and a conductor 51 to the other side of the socket 15. This affords a series circuit wherein the switch 6 is connected in series to the bulb 3 and the batteries 4 and 5.

The contact 52 of the normally open, low temperature, thermostatically actuated switch 7 is connected by a conductor 53 to the conductor 47. The other contact 54 of the switch 7 is connected by a conductor 55 to the conductor 51. This affords another series circuit between the batteries 4 and 5 and the bulb 3 through the conductors 46, 47 and 53, the switch 7, the conductors 55 and 51, the socket 15, and the conductor 45. It will also be observed that with these two series circuits, the switches 6 and 7 are connected in parallel to each other between the conductors 47 and 51.

The high temperature switch 6 is of the type wherein it is normally open and remains open until the temperature of the atmosphere surrounding the warning device 1 increases beyond a predetermined temperature, such as, for example, 95° F. The low temperature switch 7 is of a type wherein it is normally open and remains open until the temperature of the atmosphere surrounding the warning device 1 decreases below a predetermined temperature, such as, for example, 48° F.

With this construction, when the warning device 1 is in assembled condition, and the temperature of the atmosphere surrounding it is between the aforementioned upper and lower predetermined temperatures, the switches 6 and 7 remain open and, therefore, the bulb 3 is not energized by the batteries 4 and 5 and is not illuminated. However, if the temperature of the atmosphere surrounding the warning signal 1 drops below the aforementioned lower predetermined temperature, the control thermostate of the switch 7 is effective to close the contacts 52 and 54 and thereby close the series circuit between the bulb 3 and the batteries 4 and 5 through the switch 7 and thereby cause illumination of the bulb 3, and thereby signal the presence of an excessively low temperature at the location of the warning device 1. Preferably, the bulb 3 is of the "flasher type" readily available on the market so that when it is energized it is intermittently illuminated to thereby afford a flashing type signal.

Similarly, with the warning device 1 in assembled condition, with the switches 6 and 7 in their normal open condition, if the temperature surrounding the warning device 1 rises above the aforementioned higher predetermined temperature, the control thermostat of the switch 6 is effective to close the contacts 48 and 49 to thereby close the series circuit between the bulb 3 and batteries 4 and 5 through the switch 6 and cause illumination of the bulb 3, and thereby signal the presence of an excessively high temperature at the location of the warning device 1.

Preferably, the switch 6 is of such a type that when it has once been actuated, it will remain closed until the temperature of the control thermostat therefor has dropped to a temperature substantially below the temperature effective to cause closing thereof. For example, if the temperature effective to cause closing thereof is the aforementioned temperature of 95° F., the temperature to which the control thermostat of the switch 6 must be cooled before the switch 6 again opens, is preferably in the nature of 65° F.

Likewise, the switch 7 is preferably of such a type that when it has been actuated, the temperature to which the control thermostat therefor must be raised before the switch 7 again opens is considerably higher than the temperature at which the control thermostate was effective to close the switch. For example, with the temperature at which the switch 7 closes being the aforementioned temperature of 48° F., the temperature at which the control thermostat therein is effective to again open the switch 7 is preferably in the nature of 75° F.

With the thermostats 6 and 7 being of the aforementioned types, if a condition arises wherein either one of them has been actuated, a minor correction in the temperature differential back into the preferred range of temperature is not effective to stop the signaling of the warning device 1, so that in the event there is a delay in observing the signal, the person checking the same will know that there has been a deviation from desired conditions and will be alerted to investigate the cause thereof.

The novel warning device 1 is so constructed that when either one of the switches 6 and 7 has been actuated, it readily may be reset manually, so that the warning device 1 may be quickly and easily returned to its normal condition wherein it functions to maintain a constant check on the temperature of the surrounding atmosphere. Thus, if the high temperature switch 6 has been actuated, and it is desired to reset it, this may be readily accomplished by placing a cool object, such as, for example, an ice cube on the control thermostat portion 39 thereof to thereby cool the same below the resetting temperature, such as, for example the aforementioned 65° F. Similarly, if the low temperature thermostat 7 has been actuated, this may be readily reset by the operator placing his thumb on the control thermostat 40 thereof to thereby warm the latter above the resetting temperature, such as, for example, above the aforementioned 75° F. It will be remembered that the control thermostats 39 and 40 of the switches 6 and 7, respectively, are mounted in the upper face of the top wall 9 of the housing 2, so that they are readily accessible for such resetting operations from outside the housing 2.

In the preferred form of the invention shown in the drawings, a manually actuated switching 56, which is preferably of the push-button type, is mounted in the top wall 9 of the housing 2 in position to be actuated from outside of the housing 2. The normally open contacts 57 and 58 of the switch 56, FIG. 6, are connected to the conductors 46 and 51, respectively, to thereby connect the switch 56 in series between the bulb 3 and the batteries 4 and 5. It will be seen that this affords a third series circuit between the bulb 3 and the batteries 4 and 5, with the switch 56 connected in parallel relation to the switches 6 and 7. With this construction, the switch 56 affords a test switch which may be manually closed to thereby test whether the batteries 4 and 5 and the bulb 3 are in good operating condition, the switch 56 again being opened after the testing has been accomplished.

It will be seen that the present invention affords a novel warning device which is entirely independent of any outside source of electric power. This is of importance, because, among other things, with a warning device which must be connected to a wiring system in the home or office in which it is installed, the very malfunction, which would cause freezing or a fire, and against which the warning device is intended to afford protection, may be accompanied by a power failure in the aforementioned wiring, which would thus render the warning device useless.

Also, it will be seen that the present invention affords a compact unit which readily can be constructed in such small size that it is readily portable. This, coupled with its self-contained mode of operation, affords a unit which may be readily placed at substantially any desired location, such as, for example, on a window-sill, or on a table, or hung on a wall near a window by means of a suitable opening in the housing, and the like, where it will be readily visible from a particular location outside of the home or office in which it is installed, such as, for example, from a neighbor's window or from the street in front of a house, and the like. Because of its self-contained mode of operation, this may be accomplished irrespective of whether an outside electric power source is available.

In addition, it will be seen that the present invention affords a novel warning device which is effective to emit a readily visible signal, so as to effectively signal a warning if the surrounding temperature either increases or decreases beyond a predetermined range. Thus, it affords effective protection against excessive overheating and fire, as well as excessively low temperatures and freezing.

Also, it will be seen that the preferred embodiment of the present invention affords a novel warning device which, once it has been actuated, will remain actuated until a correction in temperature of the control therefor has been effected which is considerably in excess of the temperature effective to cause actuation. With this construction, insurance is afforded that once a malfunction has occurred, it will be investigated. For example, if a fire had occurred which was sufficient to actuate the high temperature thermostat 6 and then subsequently died down, a person checking the warning device 1 would be advised that a malfunction had occurred and would be alerted to investigate even though the fire was no longer burning or had died down to such a low level that it no longer maintained the room temperature above the normal actuation temperature for the high temperature thermostat 6. Similarly, once the temperature surrounding the warning signal 1 has dropped below the lower temperature effective to actuate the switch 7, the warning signal 1 continues sending its singal even though the situation may have corrected itself, so that the person checking the signal will again be alerted to investigate and determine the cause of the temperature drop. With this construction and mode of operation, it will be seen that an effective warning device is afforded whereby a dangerous condition may be checked and corrected prior to extensive damage having been caused thereby or as a result thereof.

In addition, it will be seen that the present invention affords a warning device which, once it has been actuated, may be quickly and easily reset for normal operation.

Also, it will be seen that the present invention affords a novel electrically actuated warning device for warning of excessively high and low temperatures, which is practical and effecient in operation and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. An electrically actuated warning device for warning of excessively high and low temperatures comprising:
   (a) a housing,
   (b) an electric bulb mounted on said housing,
   (c) a battery source of electric current for supplying electric current to said bulb, and
   (d) means for controlling the supplying of electric current to said bulb by said battery,
   (e) said means comprising:
      (1) a thermostatically actuated, normally open switch
         (a') connected in a series circuit between said bulb and said battery source, and
         (b') operable to close said circuit and thereby energize said bulb in response to an increase in temperature above a predetermined temperature, and
      (2) another thermostatically actuated, normally open switch
         (a') connected in another series circuit between said bulb and said battery source, which other series circuit is connected in parallel to said first mentioned series circuit, and
         (b') operable to close said other series circuit and thereby energize said bulb in response to a decrease in temperature below a predetermined temperature,
   (f) each of said switches including a temperature sensitive portion mounted in an aperture in said housing in position to be physically engaged from outside said housing for restoring the temperature of said switch to a normally open condition.

2. An electrically actuated warning device as defined in claim 1, and in which:
   (a) said temperature sensitive portion is disposed substantially flush with the outer surface of said housing.

3. An electrically actuated warning device as defined in claim 1, and in which:
   (a) said means includes:
      (1) a normally open, other switch
         (a') connected in a third series circuit between said bulb and said battery source, which third series circuit is connected in parallel to said first mentioned and other series circuits, and
         (b') operable to be manually closed to thereby close said third series circuit.

4. An electrically actuated warning device as defined in claim 1, and in which:
   (a) said housing includes:
      (1) a top wall, and
      (2) a bottom wall removably mounted in upwardly spaced relation to the bottom of said housing and in downwardly spaced relation to said top wall,
   (b) said switches are mounted in said housing between said top and bottom walls in position to dispose said temperature sensitive portions for said physical engagement from the top of said housing, and
   (c) said battery source is removably mounted in said housing below said bottom wall for removal from and insertion into said housing through the bottom thereof.

5. An electrically actuated warning device as defined in claim 4, and in which:
   (a) said bulb projects upwardly from said top wall and is removably mounted therein in position to be inserted into and removed from said top wall from the top of said housing.

References Cited

UNITED STATES PATENTS

| | | | |
|---|---|---|---|
| 2,806,108 | 9/1957 | Babson | 340—227.1X |
| 2,839,639 | 6/1958 | Adlerstein | 340—227.1X |
| 3,258,757 | 6/1966 | Burdwood | 340—283X |

DONALD J. YUSKO, Primary Examiner

D. L. TRAFTON, Assistant Examiner

U.S. Cl. X.R.

340—283